Jan. 4, 1966 H. R. POUTSCH 3,227,293
SILO UNLOADER
Filed Aug. 14, 1963 2 Sheets-Sheet 1
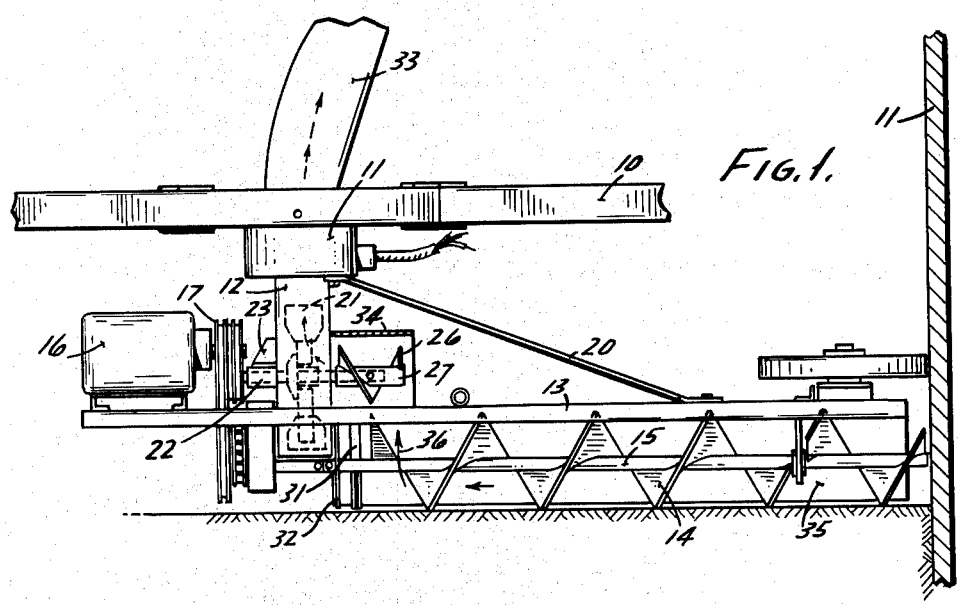
INVENTOR.
HARLOW R. POUTSCH
BY
Wheeler, Wheeler & Wheeler
ATTORNEYS.

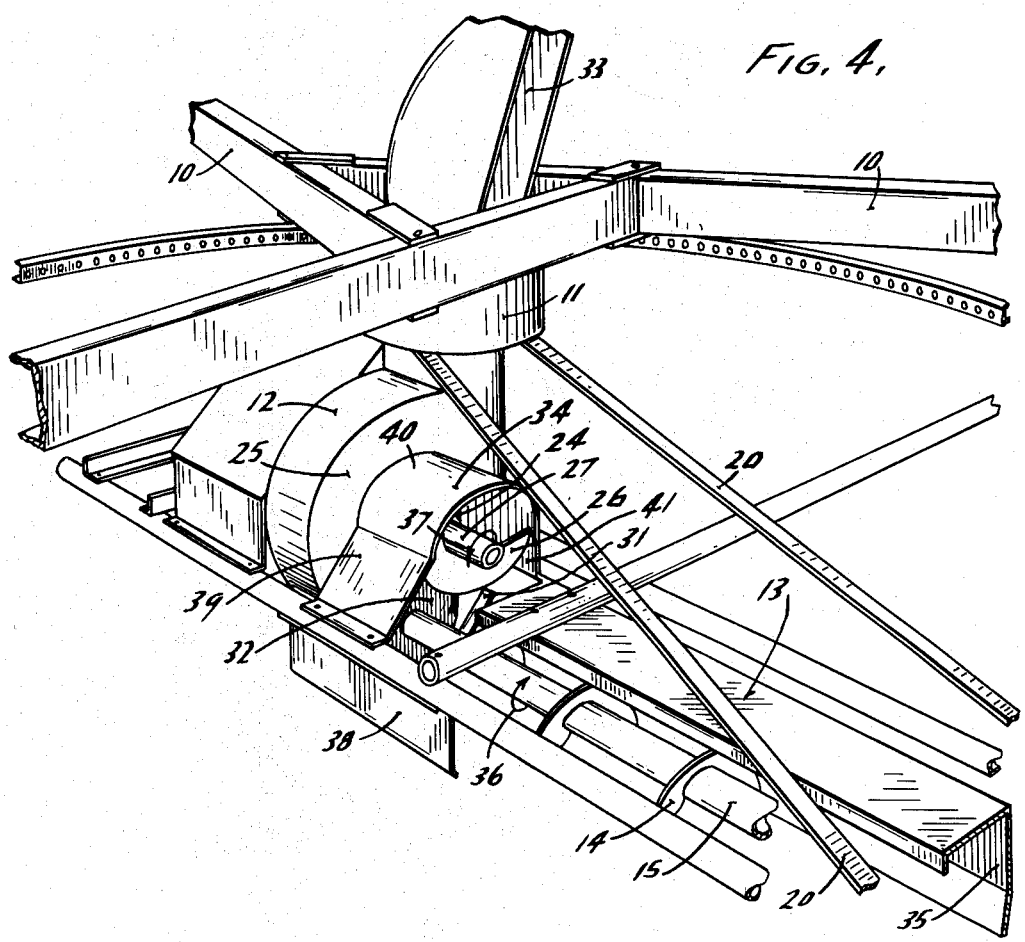

United States Patent Office 3,227,293
Patented Jan. 4, 1966

3,227,293
SILO UNLOADER
Harlow R. Poutsch, Fort Atkinson, Wis., assignor, by mesne assignments, to James Manufacturing Company, Inc., c/o Butler Manufacturing Co., Kansas City, Mo., a corporation of Wisconsin
Filed Aug. 14, 1963, Ser. No. 302,209
4 Claims. (Cl. 214—17)

This invention relates to silo unloaders.

The present invention constitutes an improvement upon the silo unloader shown in my U.S. Patent No. 2,963,327 granted December 6, 1960, to which reference may be made for details not repeated here because such are clearly shown in my prior patent aforesaid and are incorporated herein by reference.

In my prior patent aforesaid, the gathering auger brings silage to the center of the silo and pushes the silage into the casing of a rotary impeller which elevates the silage and expels it through a chute laterally through the silo door.

In accordance with the present invention, a considerable increase in the quantity of delivered silage and a reduction in the power requirements of the unloader is achieved. This is accomplished in the present invention by a stub auger which is mounted on the shaft of the rotary impeller to assist the gathering auger in conveying the silage into the impeller casing.

Accordingly, the present invention is embodied in such a silo unloader in which both the gathering means auger and a stub auger on the shaft of the impeller coact in conveying silage into the impeller housing. In the disclosed empodiment of the invention, the gathering auger and the stub auger are disposed on axes which are in parallel spaced relationship, the stub auger being disposed substantially vertically above the gathering auger.

A shroud is desirably disposed about the stub auger for channeling the silage into the opening of the impeller housing and the end of the gathering auger beneath the stub auger is desirably provided with kicker blades to throw incoming silage into the path of the stub auger.

Other objects, advantages and features of the invention will appear from the following disclosure in which:

FIGURE 1 is a fragmentary side elevation of a silo unloader embodying the present invention, shown disposed in a silo only portions of which are illustrated.

FIGURE 2 is a vertical cross section taken through that portion of the impeller housing and associated augers near the center of the silo.

FIGURE 3 is a fragmentary cross section taken along the line 3—3 of FIGURE 2.

FIGURE 4 is a fragmentary perspective view of a silo unloader embodying the invention.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

As in my prior patent aforesaid, the silo unloader is suspended by its frame 10 within a silo, only one wall 11 of which is illustrated in the drawings. The frame 10 is provided with a central bearing assembly 11 from which the impeller housing 12 is rotatably supported. The impeller housing or casing 12 supports the horizontal frame 13 upon which the gathering auger 14 is rotatably mounted on its shaft 15. Frame 13 also supports an electric motor 16 which drives through a pulley transmission 17 the shaft 15 for auger 14 and also shaft 18 for the impeller blades 21 disposed within the housing 12. The bearing 22 for shaft 18 is mounted on the housing 12 by bracket 23. Frame 13 is stabilized by braces 20.

In the silo unloader shown in my prior patent, the shaft 18 did not extend outwardly beyond the opening 24 provided in side wall 25 of the housing 12. In the device of the present invention, however, shaft 18 extends through opening 24 and therebeyond and is provided with a stub auger 26 the hub 27 of which is securely fastened to the shaft by the set screw 28. Auger 26 thus rotates at the same speed as shaft 18. As shown in FIGS. 2 and 3, opening 24 is extended laterally toward the periphery of casing 12 and toward the path of silage brought in by the gathering auger 14. Accordingly, the opening admits silage into the casing near its periphery.

No substantial change is made in the auger 14 from what is shown in my prior patent, except for the optional, but desirable, addition of kicker blades 31 which are mounted on the shaft 15 at the inner end of the auger 14. These blades 31 are disposed directly below the stub auger 26 and throw silage toward the stub auger 26. The inner end of the shaft 15 is also provided with a blocking plate 32 which prevents the auger 14 from pushing the silage underneath the housing 12 and helps deflect the silage upwardly through the opening 24 and into the housing 12.

In the device of my prior patent, the gathering auger was alone responsible for pushing the silage into the impeller housing. In the present device, the gathering auger and the stub auger cooperate to physically convey the silage into the impeller housing where it is lifted by the blades 21 upwardly and laterally through the chute 33 and out the door of the silo. The stub auger 26 has been found to greatly increase the amount of silage delivered by the silo unloader. By reason of the improvement of the present invention, the speed of rotation of the shaft 18 has been reduced from 1750 r.p.m. (in the construction shown in my prior patent) to approximately 1460 r.p.m., thus reducing the horsepower requirements of the motor 16 notwithstanding the increased volume of silage delivered by the silo unloader.

In order to better channel the flow of silage into the opening 24 and cooperate with auger 26, a shroud 34 is desirably bolted to the frame 13. The shroud channels the silage into the opening 24 and coacts with the auger 26 in much the same way that the shroud 35 on frame 13 coacts with the gathering auger 14 in the transport of silage axially of the auger shafts. Shroud 34 encloses the top of auger 26 but is open to auger 14. It has a curved top 40 concentric with auger 26 and sides 39, 41 diverging away from auger 26 to serve as a funnel to guide silage conveyed upwardly by auger 14 and blades 31. In instances where the silage is lumpy, the shroud 34 may be removed to preclude clogging of the auger 26 and thus relieve the system of these lumps.

As best shown in FIGURES 3 and 4, auger 14 in the disclosed embodiment rotates clockwise in the direction of arrows 36 and auger 26 rotates counterclockwise in the direction of arrows 37. The augers 14, 26 are in offset parallel relation. The direction of relative rotation of the augers is not critical, however. Moreover, the two augers 14 and 26 need not be parallel, so long as auger 26 is offset in laterally spaced relation above auger 14 and conveys material received from auger 14 to the impeller.

I also desirably provide a shroud plate 38 on frame 13 near the discharge end of auger 14 to help channel flow of silage to auger 26 and confine it against loss laterally of its direction of intended movement.

I claim:
1. A silo unloader comprising:
    (a) gathering means for bringing silage to the center of a silo on a substantially horizontal path,
    (b) impeller means at the center of the silo comprising
        (i) a series of silage impelling blades mounted for rotation on a substantially horizontal shaft hav- ing its axis spaced laterally above the path of silage brought in by the gathering means,
(ii) a casing about said blades and having an opening to admit silage thereinto and through which said shaft extends, said opening being laterally extended toward the path of silage brought in by the gathering means to admit silage into the casing near its periphery,
(c) stub auger means on said shaft outside said casing and aligned with said opening and rotatable with said impeller blades on an axis laterally spaced above the path of silage brought in by the gathering means for cooperating with said gathering means in conveying silage brought in by the gathering means through said opening and into said casing.

2. The silo unloader of claim 1 in combination with shroud means about said stub auger for channeling silage conveyed by said auger through said opening.

3. The silo unloader of claim 1 in which said gathering means comprises auger means having a shaft with its axis in offset laterally spaced relation to the axis of the shaft of the stub auger.

4. The silo unloader of claim 3 in which the gathering means auger is provided with kicker blade means below the stub auger.

References Cited by the Examiner
UNITED STATES PATENTS

| | | | |
|---|---|---|---|
| 2,719,058 | 9/1955 | Van Dusen | 302—56 |
| 2,816,804 | 12/1957 | Harrer | 302—56 |
| 2,963,327 | 12/1960 | Seymour | 302—56 |

SAMUEL F. COLEMAN, *Primary Examiner.*

ANDRES H. NIELSEN, *Examiner.*